United States Patent

Takagi

[11] Patent Number: 5,151,140
[45] Date of Patent: Sep. 29, 1992

[54] HEAVY-DUTY PNEUMATIC RADIAL TIRE

[75] Inventor: Makoto Takagi, Hiratsuka, Japan

[73] Assignee: The Yokohama Rubber Co., Ltd., Tokyo, Japan

[21] Appl. No.: 450,781

[22] Filed: Dec. 14, 1989

[30] Foreign Application Priority Data

Dec. 30, 1988 [JP] Japan .................................. 63-334896

[51] Int. Cl.$^5$ .............................................. B60C 15/06
[52] U.S. Cl. ...................................... 152/543; 152/546
[58] Field of Search ............... 152/539, 540, 543, 546, 152/556, 542

[56] References Cited

U.S. PATENT DOCUMENTS

| 4,046,183 | 9/1977 | Takahashi et al. | 152/546 X |
| 4,215,737 | 8/1980 | Motomura et al. | 152/546 X |
| 4,319,621 | 3/1982 | Motomura et al. | 152/542 |
| 4,508,152 | 4/1985 | Sano et al. | 152/543 |
| 4,747,436 | 5/1988 | Williams | 152/546 X |

Primary Examiner—Michael W. Ball
Assistant Examiner—Nancy T. Krawczyk
Attorney, Agent, or Firm—Nikaido, Marmelstein, Murray and Oram

[57] ABSTRACT

A heavy-duty pneumatic radial tire having a bead portion comprising a carcass layer having its respective end portions turned up about a bead core from the inner side to the outer side of the tire and at least two reinforcing layers disposed along a portion of the carcass layer, which tire comprises an inner reinforcing layer having a tenacity of from 30 kg/mm of layer width inclusive to 80 kg/mm of layer width not inclusive, incorporated on the inner side of the bead portion, and an outer reinforcing layer having a greater tenacity than the inner reinforcing layer and of at least 80 kg/mm, of layer width incorporated on the outside of the bead portion, wherein cords in the inner reinforcing layer and those in the outer reinforcing layer are inclined in a same direction relative to the radial direction of the tire, and when mounted on a vehicle the direction of inclination of the cords in the inner and the outer reinforcing layers is opposite the direction of forward rotation of the tire.

5 Claims, 3 Drawing Sheets

HEAVY-DUTY PNEUMATIC RADIAL TIRE

BACKGROUND OF THE INVENTION

The present invention relates to a heavy-duty pneumatic radial tire, and more specifically, a heavy-duty pneumatic radial tire having an improved durability.

Conventionally, in heavy-duty pneumatic radial tires (hereinafter referred to simply as heavy-duty tires), as shown in FIG. 2 of the accompanying drawings their bead portion 3 comprises a single carcass layer 1 having its respective end portions turned up about a bead core 2 from the inner side to the outer side of the tire in a manner of enrobing a rubber stock 5, and a single reinforcing layer 6 also turned up from the inner side to the outer side of the tire along a portion of the carcass layer 1. In the bead portion 3 of such heavy-duty tires, there exists a point of discontinuation of rigidity in the vicinity of the end edge portion indicated at $1_E$ of the carcass layer 1. Thus, when the bead portion 3 undergoes a deformation, there tends to occur the generation of strain or the concentration of stress in the above point of discontinuation of rigidity, to produce a separation trouble, giving a rise to a lowering of the durability of the tire.

In order to prevent the generation of strain and suppress the stress concentration in the vicinity of the end edge portion $1_E$ of the carcass layer 1, attempts have been made to increase the rigidity of a rubber layer in the bead portion which is contacted with a rim on which the tire is mounted or to cover the end edge portion $1_E$ with a reinforcing layer 4 to thereby suppress the possibility of movement around the bead core 2 and suppress the deformation of the bead portion 3. However, a limitation is applicable to the possibility of increasing the rigidity of a rubber layer to be applied about the bead core 2 and also to the tenacity of the reinforcing layer 4, so that even according to the above attempts, it has been impossible to sufficiently suppress the movement around the bead core and the deformation of the bead portion.

Also, the above reinforcing layer 6 applied along a portion of the carcass layer 1 at a cord angle relative to the radial direction of the tire is turned up around the bead core 2, so that cords on the inner side of the bead portion cross cords on the outer side of the bead portion. Therefore, when the bead portion undergoes a deformation, the reinforcing layer 6 tends to undergo a twist, whereby the concentration of stresses applied to the end edge portion of the bead portion tends to be promoted and the generation of strain cannot be suppressed, resulting in a lowering of the durability of the bead portion.

SUMMARY OF THE INVENTION

Accordingly, objects of the present invention center upon providing a heavy duty tire with which the concentration of stresses and the generation of strain in the end edge portion of the carcass layer are suppressed to thereby suppress the possibility of the bead portion to undergo deformation and which can exhibit a remarkably improved durability.

Such object of the invention can be attained according to the present invention by providing a heavy duty tire which includes a bead portion comprising a carcass layer of which each end portion is turned up around a bead core from the inner side to the outer side of the bead portion and at least two reinforcing layers disposed along a portion of the carcass layer, and in which an inner reinforcing layer having a tenacity of 30 kg/mm of layer width to less than 80 kg/mm of layer width is incorporated on the axially inner side of the bead portion and an outer reinforcing layer having a greater tenacity than the inner reinforcing layer and of at least 80 kg/mm is incorporated on the axially outer side of the bead portion, wherein the reinforcing cords in the inner reinforcing layer and those in the outer reinforcing layer are inclined in a same direction relative to the radial direction of the tire, and of which tire it is specified that it should be mounted on a vehicle in a manner such that the direction of inclination of the reinforcing cords is opposite the direction of the forward rotation of the tire.

DETAILED DESCRIPTION OF THE PREFERRED EMBODIMENTS

Figure 1:
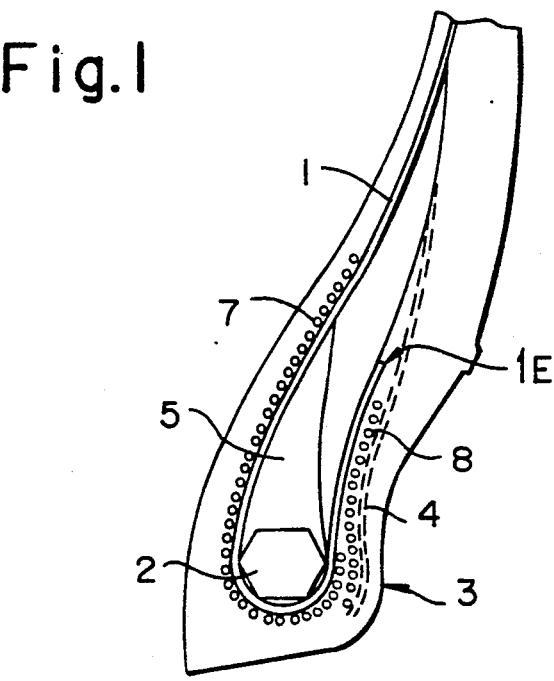
FIG. 1 is a partial sectional view, showing the structure of the bead portion of an embodiment of heavy duty tires according to the present invention.

As shown in FIG. 1, in the tire according to the present invention, an inner reinforcing layer 7 and an outer reinforcing layer 8, independent of each other, are incorporated on the axially inner side and on the axially outer side of a bead portion 3 respectively, along a portion of a carcass layer 1 of which each end portion is turned up about a bead core 2 from the inner side to the outer side of the tire, in a manner so as to enrobe a rubber stock 5.

Preferably, the inner reinforcing layer 7 is provided on the axially inner side of the bead portion, and extends from an upper area corresponding to the location of the end edge portion $1_E$ of the carcass layer 1, around the bead core 2. On the other hand, the outer reinforcing layer 8 is provided on the axially outer side of the bead portion 3, extending from the outer end portion of the inner reinforcing layer 7 applied about the bead core 2, preferably a bead heel portion in contact with a rim on which the tire is mounted, to a radial height terminating below the end edge portion $1_E$ of the carcass layer 1.

In order to improve the tire durability according to the invention, it is required to meet that the inner reinforcing layer 7 has a tenacity within a range of 30 kg/mm of layer width to less than 80 kg/mm of layer width and that the outer reinforcing layer 8 has a tenacity of at least 80 kg/mm of layer width.

In or for the present invention, the tenacity of reinforcing layers 7 and 8 is defined as the tensile strength (kg/mm) in the axial direction of cords in the layers 7 and 8 per millimeter (mm) of the width of the reinforcing layers in the direction perpendicular to the axial direction of the cords.

It is also required to meet according to the invention that the outer reinforcing layer 8 has a tenacity greater than that of the inner reinforcing layer 7. This is because as follows: In heavy-duty tires, in the condition of the bead portion in contact with a rim the stress applied to the bead portion is larger on the axially outer side than on the axially inner side of the bead portion, and the frequency at which a stress application takes place is by far greater on the outer side of the bead portion than on the inner side. Therefore, unless the tenacity of the outer reinforcing layer is greater than that of the inner reinforcing layer, it is impossible to attain a sufficient improvement in or relating to the durability of the bead portion. The difference in the tenacity between the outer reinforcing layer and the inner reinforcing layer is preferably within a range of from 20 to 90 kg/mm of layer width.

The above inner and outer reinforcing layers having different tenacity values can be easily provided by means of appropriately selectively combining various fiber materials with one another or selectively setting an appropriate end count of the reinforcing cords for each reinforcing layer.

In or for the tire according to the invention, it is further required to answer that the cords in the inner reinforcing layer and those in the outer reinforcing layer are inclined in a same direction relative to the radial direction of the tire. If the cords in either reinfocing layer and those in the other reinforcing layer are not inclined in a same direction but are crossed with one another, then the reinforcing layers tend to undergo twist, when the stress concentration in the end edge portion of the carcass layer tends to be promoted, resulting in a lowering of the durability. The cord angle of the reinforcing cords in the reinforcing layers should preferably be within a range of 50° to 70° relative to the radial direction.

Figure 3:
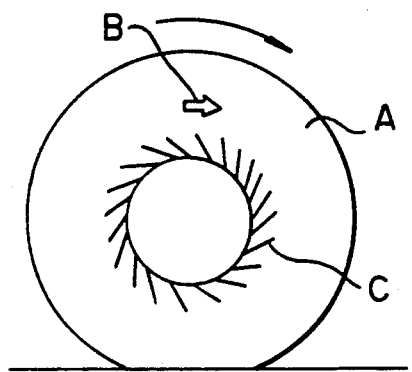
FIG. 3 is a schematic side view of a tire according to the invention, taken for an illustration of the relationship between the direction of forward rotation of the tire and the direction of inclination of reinforcing cords in reinforcing layers in the tire according to the invention.

It is further defined according to the invention that as shown in FIG. 3, the tire of the invention should be mounted on a vehicle in a manner such that the direction of inclination of the cords C in the inner and outer reinforcing layers is opposite to the direction of the forward rotation of the tire A as shown by an arrow. Preferably, the necessary direction for this specified manner of mounting of the tire on vehicles should be given in the form of an arrow B or any other mark, symbol or letters, which may be provided on a side wall portion of the tire during the molding of the tire. If the tire acording to the invention is mounted on a vehicle as directed according to the invention, at the time of the forward rotation of the tire the inner and outer reinforcing layers receive a pulling force application, so that it is possible to let the reinforcing layers fully exhibit their effect of reinforcement. On the contarary, if the tire is mounted in a manner such that the direction of inclination of the cords in the reinforcing layers coincide with the direction of forward rotation of the tire, at the time of forward rotation of the tire the reinforcing layers are permitted to come into a loosened condition, when the reinforcing layers can no longer exhibit a sufficient effect of reinforcement.

EXAMPLE 1

Using an inner reinforcing layer comprising steel cords of a cord structure of $7 \times 3(0.15)$ and a tenacity of 90 kg/cord and having a layer tenacity of 46 kg/mm of layer width and an end count of 25.5 E/50 mm, there were built comparative tires F and G and tires of the invention H, I and J, which commonly had a bead portion structure as shown in FIG. 1 and had different respective outer reinforcing layers having such structures and tenacity values of steel cords, and end counts and tenacity values of layers as shown in the below Table 1. In each of the tires, the cords in the inner reinforcing layer and those in the outer reinforcing layer are inclined in a same direction at a cord angle of 65° to the radial direction of the tire. Also, the tires commonly had a tire size of 10.00 R 20.

Figure 2:
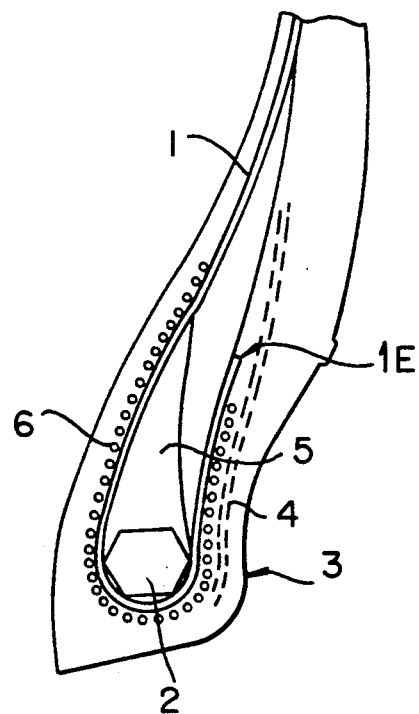
FIG. 2 shows a partial sectional view of the structure of the bead portion in a conventional heavy duty tire.

Separately, a conventional tire was built, which had a bead portion structure as shown in FIG. 2, a same inner reinforcing layer as above and a same tire size as above.

TABLE 1

|  | Outer Reinforcing Layer | | | |
|---|---|---|---|---|
|  | steel cords | | reinforcing layer | |
|  | tenacity | structure | end count | tenacity |
| Comparative Tire F | 200 | 3(0.20) + 6(0.38) | 17.5 | 70 |
| Comparative Tire G | 200 | 3(0.20) + 6(0.38) | 20.0 | 80 |
| Tire of Invention H | 200 | 3(0.20) + 6(0.38) | 22.5 | 90 |
| Tire of Invention I | 200 | 3(0.20) + 6(0.38) | 25.0 | 100 |
| Tire of Invention J | 270 | $3 + 9 + 15(0.22)^{1H}$ | 24.0 | 130 |
| Conventional Tire | 90 | $7 \times 3(0.15)$ | 25.5 | 46 |

Of each of the above prepared tires, the following described tire durability test was operated. Tire durability test:

Each test tire mounted on a $20 \times 7.00$ T rim was tested on an indoor drum tester of a drum diameter of 1707 mm $\phi$ to determine the time at which the bead portion underwent a rupture under the following conditions.
Load: 4000 kg
Inflation Pressure: 8.50 kg/cm$^2$
Velocity: 45 km/hour Further, of each of the tires F, G, H, I and J, the direction of inclination of cords in the inner and the outer reinforcing layers was arranged to be opposite the direction of forward rotation of the tires as shown in FIG. 3.

Figure 4:
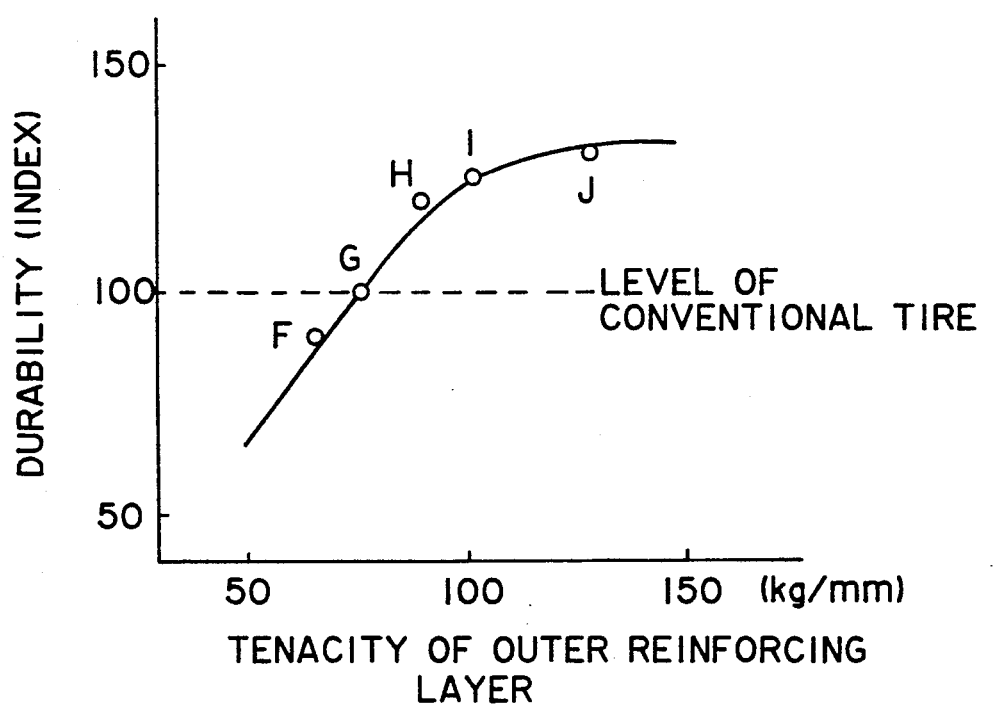
FIGS. 4 to 6 are charts, showing the relationship between the tenacity of the outer reinforcing layer and the tire durability (FIG. 4) and that between the tenacity of the inner reinforcing layer and the tire durability (FIGS. 5 and 6).

The results of the tests are shown in FIG. 4 in terms of indices, taking the result found of the conventional tire taken as 100. A larger value (index) represents a more desirable durability.

From FIG. 4, it is seen that tires of the present invention H, I and J in which the outer reinforcing layer had a tenacity of at least 80 kg/mm of layer width have an exceeding durability in comparison to the conventional tire and that the comparative tires F and G have a durability inferior to, or at best equal to, that of the conventional tire.

Then, using an outer reinforcing layer comprising steel cords of a cord structure of 3(0.20)+6(0.38) and a tenacity of 200 kg/cord and having an end count of 19.5 E/50 mm and a layer tenacity of 78 kg/mm, of layer width there were built comparative tires K, L, M, N, O and P, which commonly had a bead portion structure as shown in FIG. 1 and had different respective inner reinforcing layers having such structures and tenacity values of steel cords, and end counts and tenacity values of layers as shown in the below Table 2. In each of the tires, the cords in the inner reinforcing layer and those in the outer reinforcing layer are inclined in a same direction at a cord angle of 65° to the radial direction of the tire. Also, the tires commonly had a tire size of 10.00 R 20.

TABLE 2

|  | Inner Reinforcing Layer | | reinforcing layer | |
|---|---|---|---|---|
|  | steel cords | | end | |
|  | tenacity | structure | count | tenacity |
| Comparative Tire K | 90 | 7 × 3(0.15) | 16.5 | 30 |
| Comparative Tire L | 90 | 7 × 3(0.15) | 22.0 | 40 |
| Comparative Tire M | 121 | 3 + 9(0.22)¹ʷ | 18.5 | 45 |
| Comparative Tire N | 121 | 3 + 9(0.22)¹ʷ | 20.5 | 50 |
| Comparative Tire O | 200 | 3(0.20) + 6(0.38) | 15.0 | 60 |
| Comparative Tire P | 200 | 3(0.20) + 6(0.38) | 17.5 | 70 |

Figure 5:
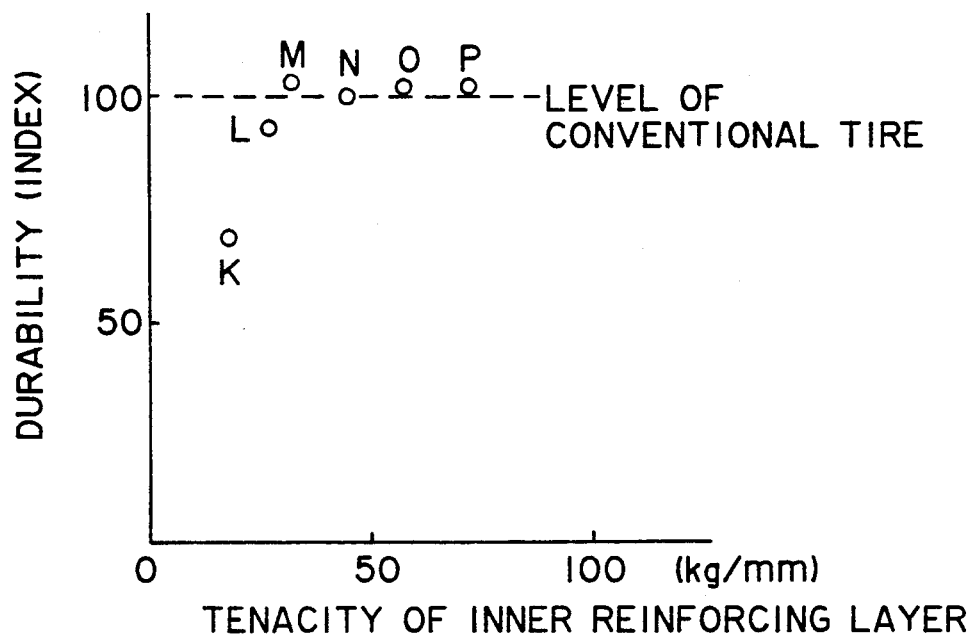

Of each of the above tires K, L, M, N, O and P, a same durability test as above was conducted to obtain results as shown in FIG. 5.

From FIG. 5, it is seen that where the tenacity of the outer reinforcing layer does not reach 80 kg/mm, of layer width even if the tenacity of the inner reinforcing layer is changed in any way, the durability obtainable cannot exceed a same durability level as in the case of the conventional tire.

Further, using an outer reinforcing layer comprising steel cords of a cord structure of 3(0.20)+6(0.38) and a tenacity of 200 kg/cord and having an end count of 25.5 E/50 mm and a layer tenacity of 102 kg/mm, of layer width there were built comparative tires Q and R and tires of the invention S, T, U and V, which commonly had a bead portion structure as shown in FIG. 1 and different respective inner reinforcing layers having such structures and tenacity values of steel cords, and end counts and tenacity values of layers as shown in the below Table 3. In each of the tires, the cords in the inner reinforcing layer and those in the outer reinforcing layer are inclined in a same direction at a cord angle of 65° to the radial direction of the tire. Also, the tires commonly had a tire size of 10.00 R 20.

TABLE 3

|  | Inner Reinforcing Layer | | reinforcing layer | |
|---|---|---|---|---|
|  | steel cords | | end | |
|  | tenacity | structure | count | tenacity |
| Comparative Tire Q | 90 | 7 × 3(0.15) | 10.0 | 18 |
| Comparative Tire R | 90 | 7 × 3(0.15) | 15.0 | 27 |
| Tire of Invention S | 90 | 7 × 3(0.15) | 18.0 | 32 |
| Tire of Invention T | 121 | 3 + 9(0.22)¹ʷ | 18.0 | 44 |
| Tire of Invention U | 200 | 3(0.20) + 6(0.38) | 17.0 | 68 |
| Tire of Invention V | 200 | 3(0.20) + 6(0.38) | 21.0 | 84 |

Figure 6:
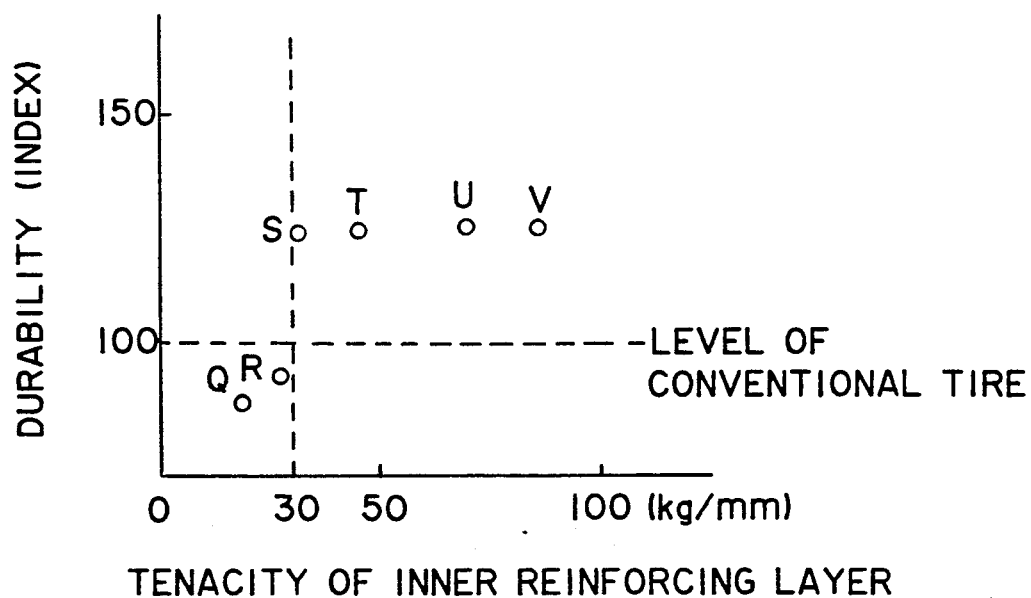

Of each of the above tires Q, R, S, T, U and V, a same durability test as above was conducted to obtain results as shown in FIG. 6.

From considering FIG. 6, it is seen that where the outer reinforcing layer had a tenacity of 102 kg/mm, of layer width the tires of the present invention S, T, U and V in which the inner reinforcing layer had a tenacity of at least 30 kg/mm, of layer width exhibit remarkably improved durability over the conventional tire but that the comparative tires Q and R in which the inner reinforcing layer had a tenacity not reaching 30 kg/mm of layer width have a poorer durability than the conventional tire.

EXAMPLE 2

A tire X was built, which comprised an inner reinforcing layer comprising steel cords of a cord structure of 7×3(0.15) and a tenacity of 90 kg/cord and having an end count of 25.5 E/50 mm and a layer tenacity of 46 kg/mm, of layer width and an outer reinforcing layer comprising steel cords of a cord structure of 3(0.20+6(0.38) and a tenacity of 200 kg/cord and having an end count of 20.0 E/50 mm and a layer tenacity of 80 kg/mm of layer width. A same tire durability test as above was operated of this tire X in an arrangement such that the cords in the inner reinforcing layer and those in the outer reinforcing layer were in a same direction of inclination opposite the direction of forward rotation of the tire.

There was also built a tire Y, which had an identical structure as the above tire X except that the cords in the inner reinforcing layer cross the cords in the outer reinforcing layer, and the durability of this tire Y, too, was determined.

As a result of tests, it was found that while the tire Y had a durability index of 100 and was not different from the conventional tire, the tire X had a durability index of 120 and was remarkably improved with respect to the tire durability.

What is claimed is:

1. A heavy-duty pneumatic radial tire having a bead portion comprising a carcass layer having its respective end portions turned up about a bead core from the axially inner side to the axially outer side of the tire and at least two reinforcing layers disposed along a portion of the carcass layer, said at least two reinforcing layers comprises an inner reinforcing layer of steel cords having a layer tenacity of 30 kg/mm of layer width to less than 80 kg/mm of layer width incorporated on the axially inner side of the bead portion and an outer reinforcing layer of steel cords having a greater layer tenacity than the inner reinforcing layer and of at least 80 kg/mm of layer width, incorporated on the axially outer side of the bead portion, wherein the inner reinforcing layer extends from the axially inner side of the bead portion to the axially outer side of the portion and terminates at an area corresponding to the radially inner end of the outer reinforcing layer, wherein cords in the inner reinforcing layer and cords in the outer reinforcing layer are inclined in a same direction relative to the radial direction of the tire, and wherein when mounted on a vehicle the direction of inclination of the cords in the inner and the outer reinforcing layers is opposite to the direction of foward rotation of the tire.

2. A tire as claimed in claim 1, wherein the inner reinforcing layer and the outer reinforcing layer has a difference in the tenacity within a range of 20 to 90 kg/mm of layer width.

3. A tire as claimed in claim 1, wherein the inner reinforcing layer is provided on the axially inner side of the bead portion and extends from an upper area corresponding to an end edge portion of the carcass layer about the bead core to the axially outer side of the bead portion, and the outer reinforcing layer is provided on the axially outer side of the bead portion extending from a bead heel portion to a radial height terminating below the end edge portion of the carcass layer.

4. A tire as claimed in claim 1, wherein the cords in the inner reinforcing layer and the outer reinforcing layer are inclined at an angle within a range of 50° to 70° relative to the radial direction of the tire.

5. A tire as claimed in claim 1, wherein the steel cords in the inner reinforcing layer comprise steel cords of a cord structure of $7 \times 3(0.15)$ and have a tenacity of 85 to 95 kg/cord, and the steel cords in the outer reinforcing layer comprise steel cords of a cord structure of $3(0.20)+6(0.38)$ and have a tenacity of 180 to 220 kg/cord.

* * * * *